United States Patent Office 3,671,295
Patented June 20, 1972

3,671,295
PROCESS FOR PREPARING CARBOXYL ACID CONTAINING OLEFIN POLYMER SURFACE COATINGS USING HIGH ENERGY IONIZING RADIATION
Abraham Ravve, Chicago, and Joseph T. Khamis, Brookfield, Ill., assignors to Continental Can Company, Inc., New York, N.Y.
No Drawing. Continuation-in-part of application Ser. No. 777,870, Nov. 21, 1968. This application Aug. 7, 1970, Ser. No. 62,172
Int. Cl. B44d 1/50, 1/44, 1/02
U.S. Cl. 117—93.31  13 Claims

ABSTRACT OF THE DISCLOSURE

A process for coating articles wherein a film of an aqueous colloidal dispersion of a water dispersible carboxyl acid containing olefin polymer and a salt of a polyvalent metal is applied to the surface of the article to be coated, the aqueous dispersant is removed and the polymer cross-linked to form a hardened coating using high energy ionizing radiation.

BACKGROUND OF THE INVENTION (1) Field of the invention

This application is a continuation-in-art of our application Ser. No. 777,870, filed Nov. 21, 1968, now abandoned. This invention is related to the coating of articles such as metals, plastics, paper, and the like, and more particularly to organic coatings obtained by cross-linking carboxyl containing polymeric materials on the article surface using high energy ionizing radiation.

(2) The prior art

In the manufacture of containers from metal sheet, a protective organic coating is applied to the side of the metal sheet which is to form the interior of the container. The materials which are employed for coating the metal sheet are generally heat-curable, resinous materials which are applied in the form of a solution or dispersion in a volatile organic solvent. The wet-coated metal surface is passed through an oven in which hot air is circulated to evaporate the solvent and to cure the coating material to the required hardness. As this form of coating application is relatively slow, the art is continually seeking more rapid methods of increasing the speed of coating application.

Among the various methods which have been proposed to increase the speeds at which metal sheet can be coated is to apply a layer of suitable thickness of the ethylenically unsaturated monomer or mixture of monomers to the metal sheet surface whereupon the monomer layer is activated to interact and form a cured polymer coating by exposing the layer to a source of high energy ionizing radiation. The activation action is carried out at ambient temperatures, and since the action of the ionizing radiation is extremely rapid, the monomer layer can be rapidly polymerized to a cured coating of the required hardness in a continuous flow movement across the source of irradiation.

Although a wide variety of ethylenically unsaturated monomeric compounds have been proposed for use in forming polymeric coatings using ionizing radiation curing procedures, these compounds, when exposed to a source of high energy ionizing radiation do not always form hard, adherent, solvent-resistant coatings of the type which are required for can coatings.

SUMMARY OF THE INVENTION

In accordance with the present invention, there is provided a rapid method of preparing hard, adherent, polymeric coatings on articles and particularly metal substrates wherein there is applied to the article substrate a thin film of an aqueous colloidal dispersion of a carboxyl acid containing olefin polymer and a salt of a polyvalent metal. The aqueous dispersant is removed by evaporation and the coated side of the substrate is exposed to a source of high energy ionizing radiation for a time sufficient to effect the cross-linking of the polymer and to convert the polymer into a continuous, hard coating on the substrate.

The process of the present invention reduces the time of the oven baking cycle which is currently used for producing metal surface coatings and eliminates the air pollution problem encountered in the use of organic solvents as resin vehicle dispersants of the prior art.

The carboxyl containing olefin polymers employed in the present invention are copolymers of $\alpha$-olefins with ethylenically unsaturated acids. The $\alpha$-olefins employed in the copolymer are $\alpha$-olefins which have the general formula $RCH=CH_2$ wherein R is either a hydrogen or an alkyl group having preferably from 1 to 8 carbon atoms. Typical examples of suitable olefins include ethylene, propylene, butene-1, pentene-1, hexene-1, heptene-1, 3-methylbutene-1, 4-methylpentene-1, etc. Although polymers of olefins having higher carbon numbers can be employed in the present invention, they are not materials which are readily obtained or available. The concentration of the $\alpha$-olefin is in the range of about 75 to about 90 weight percent in the copolymer.

The ethylenically unsaturated acid component of the copolymer is an $\alpha,\beta$-ethylenically unsaturated carboxylic acid having from 3 to 8 carbon atoms. Examples of such acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate, and maleic anhydride. Although maleic anhydride is not a carboxylic acid in that it has no hydrogen attached to the carboxyl groups, it can be considered as acid for the purposes of the present invention because of its chemical reactivity being that of an acid. Similarly other $\alpha,\beta$-monoethylenically unsaturated anhydrides of carboxylic acids can be employed. The concentration of acidic monomer in the copolymer is from about 10 weight percent to about 25 weight percent, and, preferably, from 15 to 25 weight percent.

The carboxyl containing copolymers employed in the present invention may be prepared by any of the methods described in the literature. Such methods include the direct copolymerization of an $\alpha$-olefin with an $\alpha,\beta$-ethylenically unsaturated carboxylic acid comonomer at elevated temperatures (150° to 300° C.) and pressures 50 to 300 atmospheres) in the presence of a free radical initiator such as a peroxide or by the grafting of the acid comonomer to a polyolefin base by exposing a solution or finely divided powder of the polyolefin to a peroxide or ionizing radiation in the presence of the carboxylic acid comonomer.

The molecular weight of the carboxyl containing copolymers as defined in terms of melt index (ASTM-D1238-58T) is preferably in the range of 100 to 500 g./10 min., and more particularly, in the range of 150 to 400 g./10 min.

The copolymer need not necessarily be a two component polymer. Thus, although the olefin content of the copolymer should be about 75 to about 90 weight percent, more than one olefin can be employed to provide the hydrocarbon nature of the copolymer base. Additionally, any third copolymerizable monomer can be employed in combination with the olefin and the ethylenically unsaturated acid comonomer. The scope of copolymers suitable for use in the present invention is illustrated by the following examples: ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, polyethylene/acrylic acid graft copolymers, polyethylene/methacrylic acid graft copolymers, polymerized ethylene/propylene acrylic acid graft copolymers, polymerized ethylene/butene-1 methacrylic acid graft copolymers, polymerized ethylene/vinyl acetate methacrylic acid graft copolymers, polypropylene/acrylic acid graft copolymers, polypropylene/methacrylic acid graft copolymers, polybutene/acrylic acid graft copolymers, poly-3-methylbutene/acrylic acid graft copolymers, and polyethylene/acrylic acid/ethyl acrylate graft copolymers.

The polyvalent metal salts used in the practice of the present invention are the organic and inorganic salts of divalent and trivalent cations derived from elements in Groups II, III, IV-A and VIII of the Periodic Table, such as the stearates, oxalates, carbonates, bicarbonates, phosphates, chlorides, sulfates, hydroxides, and oxides and the like. Suitable divalent metal ions are $Be^{+2}$, $Mg^{+2}$, $Ca^{+2}$, $Ba^{+2}$, $Cu^{+2}$, $Cd^{+2}$, $Hg^{+2}$, $Su^{+2}$, $Pb^{+2}$, $Fe^{+2}$, $Co^{+2}$, $Ni^{+2}$ and $Zn^{+2}$. Suitable trivalent metal ions are $Al^{+3}$ and $Fe^{+3}$. Because of the purity standards required of coatings which come in contact with foodstuffs, it is preferable that the metal ions of the polyvalent salts used to prepare can coatings in accordance with the present invention for the interior surfaces of cans be limited to $Ca^{+2}$, $Mg^{+2}$, $Zn^{+2}$, and $Al^{+2}$.

The term "aqueous colloidal dispersion" as used herein includes aqueous mixtures of the carboxyl acid containing olefin polymer wherein a substantial or major amount of the polymer is actually in solution in the aqueous dispersant medium.

The aqueous colloidal dispersions used in the practice of the present invention are prepared by dispersing the carboxyl acid containing olefin polymer in an aqueous liquid system containing an amount of an alkaline compound sufficient to effect a dispersion. The alkaline compound is present in the aqueous system in an amount sufficient to neutralize a major amount of the carboxylic acid units present in the copolymer. Generally, the amount of alkaline material required to effect a stable dispersion is in the range of about 0.8 to about 1.0 stoichiometric equivalents per carboxyl group in the copolymer.

Among the various alkaline compounds which may be employed as neutralizing reagents to prepare the colloidal dispersions of the present invention are the hydroxides of the alkali metals such as NaOH, LiOH, and KOH, concentrated ammonia, ammonium hydroxide, tetramethylammonium hydroxide, monoalkyl amines such as ethylamine and propylamine, secondary and tertiary amines, such as dimethylamine and trimethylamine, diethyl and triethyl amine and the like, monoalkanol amines, such as ethanolamine and propanolamine, and polyalkanolamines such as di- and tri-ethanolamine, monocycloalkyl amines such as cyclohexylamine, and monocycloalkanol amines such as cyclohexanol amine. In addition, certain strong heterocyclic monoamines are also suitable for employment as dispersing agents, such as morpholine, and pyridine. However, $NH_4OH$ usually gives the best results in the simplest way and is, accordingly, preferred.

The amount of polyvalent metal salt incorporated in the aqueous dispersion need only be that which is necessary to effect the cross-linking of the polymer to the required degree of hardness when irradiated in accordance with the process of the present invention. Generally, the amount of polyvalent metal salt incorporated in the aqueous dispersion is in the range of about 0.1 to about 0.8 stoichiometric equivalents per carboxy group in the polymer.

As applied to the article substrate, the polymer dispersions prepared by the process of the present invention are whitish, translucent, milky liquids containing about 5 to about 30 percent by weight of the polymer, about 1 to about 20 percent by weight of the alkaline reagent and about 1 to about 10 percent by weight of the polyvalent metal salt.

To effect the coating of an article substrate in accordance with the present invention, a thin film of the aqueous dispersion of the carboxyl acid containing olefin polymer and polyvalent metal salt is applied to the substrate surface and is heated to about 110° to about 250° C. to effect removal of the aqueous dispersant and is irradiated with a source of high energy ionizing radiation, such as a beam of high energy electrons.

High energy electrons used to effect cross-linking of the carboxyl containing olefin polymer in accordance with the present invention are obtainable from beams of high energy electrons produced by high voltage electron accelerators. There are several well-known types of electron accelerators available for this purpose. For example, the Van de Graaff electrostatic accelerator resonant transformers, transformer-rectifiers, impulse of capacitrons, microwave linear accelerators, betratrons and synchrotrons. The Van de Graaff type generator and the transformer-rectifiers produce electron beams in continuous streams, while the other generators mentioned produce the beams in pulses. The electrons in the beams produced by any of these generators ordinarily possess energy exceeding 100,000 electron volts.

The dosage of the irradiation produced by these electron beams is measured in terms of the quantity of energy absorbed by the material irradiated. The "rad" is the unit of absorbed dose. In radiation dosimetry, the megarad is defined as a dose of irradiation producing an energy absorption of 100 million ergs per gram of absorbent material irradiated.

In order to effect cross-linking of the carboxyl acid containing olefin polymer by irradiation with high energy electrons in accordance with the process of the present invention, a dosage level within the range of about 0.1 megarad to about 10.0 megarads has been found to be satisfactory. Higher dosage levels have been found to produce degradation of the films which render them unsuitable as coating materials.

The electron beam cross-linking of the polymer dispersion film is inhibited by the presence of air, and therefore, it is preferred to exclude air from the reaction zone and perform the irradiation of the polymer in a vacuum or in an inert atmosphere such as nitrogen.

In coating metal substrates in accordance with the process of the present invention, the polymer dispersion is applied to the substrate in any convenient manner as by spraying, dipping, roll coating and the like.

The polymer dispersions for use in this invention may also contain fillers, dyes, pigments, and the like, provided that these materials do not affect or prevent the cross-linking of the carboxyl acid containing olefin polymer contained in these mixtures.

In coating metal surfaces in accordance with the process of the present invention, a thin film of the polymer dispersion is applied on the substrate to be coated, generally in the form of a sheet, which is positioned to travel on a conveyor and dried to remove the aqueous dispersant before it is passed under a source of an irradiation beam. In most instances, the irradiation source is maintained at about ½ to 4 inches from the substrate undergoing irradiation, but this is not especially critical.

The preferred coating weight for coating metal sheet substrates with an adequately protective organic coating suitable for use in container manufacture is in the range of 1.0 to 15.0 milligrams of cross-linked polymer coating per square inch of substrate surface. To obtain these coating weights, the aqueous polymer dispersion is applied at a coating thickness of about 0.1 to 1.5 mils, which thickness is sufficient to permit adequate penetration by the ionizing radiation to effect the cross-linking of the composition.

The present invention is illustrated, but not limited, by the following examples.

EXAMPLE I 100 grams of an ethylene/acrylic acid copolymer having a melt index of 300 decig./min. (ASTM–D1238–58T) containing 20 weight percent acrylic acid was dispersed in 400 grams of water heated to 85° C. To this mixture was added 16.8 grams of 28 percent ammonium hydroxide and the mixture heated at 95° to 98° C. for one hour to prepare a dispersion of the copolymer. The dispersion was cooled to room temperature and 7.4 grams of $ZnCO_3$ was added.

The zinc ion containing copolymer dispersion was applied to a series of 5 x 3 inch cold-rolled chromium-treated steel plates at a film thickness of 0.0001 inch. The coated plates were heated to 195° C. for 2 minutes to remove the water and then were irradiated in a nitrogen atmosphere with an electron beam at 300 million electron volts (mev.) to dosages ranging from 1.75 to 6.27 megarads. At each dosage, the irradiated polymer films were found to be cross-linked, hard, adherent coatings. The coatings were found to contain 3.2 percent by weight zinc ion. When heated to 180° F., the coatings were found to be tack-free, indicating that they were sufficiently cross-linked.

By way of contrast, coatings on steel plates coated in a manner similar to that of the example with the exception that $ZnCO_3$ was not present in the dispersion applied to the plate were found to be tacky after the coated plate was heated to 180° F. indicating that the coatings were not adequately cross-linked.

By way of further contrast, coatings on steel plates coated in a manner similar to that of the example with the exception that the ethylene/acrylic acid/$ZnCO_3$ dispersion was only heat-cured at 195° C. for 2 minutes, and not exposed to an electron beam, were found to be tacky after heating of the coated plate to 180° F.

EXAMPLE II

The procedure of Example I was repeated with the exception that ZnO was substituted for $ZnCO_3$ in the polymer dispersion. A series of tests was conducted using ZnO at varying concentrations. The radiation dosage employed in this test series was 4 megarads. The irradiated films were found to be hard, insoluble, adherent coatings. The coated plates were rubbed with a cloth saturated with methyl ethyl ketone (MEK) to determine whether the coating softens or is removed by the rubbing. The number of rubs with MEK which are required to soften or remove the coating is a direct indication of the degree to which the coating material has been cured or cross-linked. The results of the MEK test are recorded in the table below. For purposes of comparison, control runs were made in which ZnO was not present or present in amounts less than 1 percent by weight of the coating composition. The results of the MEK test on these comparative coating materials are also recorded in the table below.

For purposes of further comparison, coating materials which were not irradiated, that is, only heated to 195° C. for 2 minutes were also evaluated. The results of these comparison runs are also recorded in the table below.

TABLE

| Run No. | Zinc oxide incorporated in coating composition (percent by weight) | MEK resistance, coating composition | |
|---|---|---|---|
| | | Not irradiated (No. of rubs) | Irradiated (No. of rubs) |
| 1 | 1.0 | 6 | 19 |
| 2 | 2.0 | 12 | 19 |
| 3 | 3.0 | 12 | 20 |
| 4 | 4.0 | | 25 |
| C₁ | 0 | 2 | 3 |
| C₂ | 0.5 | 4 | 7 |

What is claimed is:

1. A process for coating an article comprising the steps of:
   applying to the surface of the article to be coated a thin film of an aqueous colloidal dispersion of a carboxyl containing olefin polymer and a polyvalent metal salt, the carboxyl-containing olefin polymer being comprised of the reaction product of an α-olefin having the general formula $RCH=CH_2$ wherein R is selected from the group consisting of hydrogen and an alkyl group having 1 to 8 carbon atoms and an α,β-ethylenically unsaturated carboxylic acid having 3 to 8 carbon atoms, the polyvalent metal salt selected from the salts of divalent and trivalent cations derived from elements in Group II, III, IV, and VIII of the Periodic Table;
   removing the aqueous dispersant from the film coated substrate; and then
   irradiating the film containing surface with a source of high energy ionizing radiation to effect cross-linking of the carboxyl containing olefin polymer to obtain the coated article.

2. The process of claim 1 wherein the dispersion contains about 5 to about 30 percent by weight of the polymer, about 1 to about 10 percent by weight of the polyvalent metal salt, and about 1 to about 20 percent by weight of an alkaline reagent required to effect the dispersion of the polymer, the remainder of the dispersion being water.

3. The process of claim 1 wherein the carboxyl containing olefin copolymer is comprised of about 75 to about 90 weight percent of the α-olefin and about 10 to about 75 weight percent of the α,β-ethylenically unsaturated carboxylic acid.

4. The process of claim 1 wherein the α-olefin is ethylene.

5. The process of claim 1 wherein the α,β-ethylenically unsaturated carboxylic acid is acrylic acid.

6. The process of claim 1 wherein the carboxyl containing olefin polymer is an ethylene/acrylic acid copolymer.

7. The process of claim 1 wherein the polyvalent metal cation is $Zn^{+2}$.

8. The process of claim 1 wherein the polyvalent metal salt is a water soluble inorganic salt.

9. The process of claim 8 wherein the polyvalent metal salt is $ZnCO_3$.

10. The process of claim 1 wherein the polyvalent metal salt is a water insoluble inorganic salt.

11. The process of claim 10 wherein the polyvalent metal salt is ZnO.

12. The process of claim 1 wherein the source of ionizing radiation is an electron beam.

13. The process of claim 7 wherein the deposited film is irradiated with a dosage of 0.1 to 10 megarads.

References Cited

UNITED STATES PATENTS 3,551,235  12/1970  Bassemir et al. -- 117—93.31 X
3,552,986  1/1971  Bassemir et al. -- 117—93.31 X RALPH S. KENDALL, Primary Examiner F. G. WHITBY, Assistant Examiner U.S. Cl. X.R.

117—104 R, 132 B, 161 UC; 204—159.14, 159.15, 159.16, 159.24; 260—29.6 H, 29.6 M